H. VON KRAMER & G. KAPP.
RESONATING RELAY.
APPLICATION FILED JUNE 4, 1913.
1,166,951.
Patented Jan. 4, 1916.
2 SHEETS—SHEET 2.
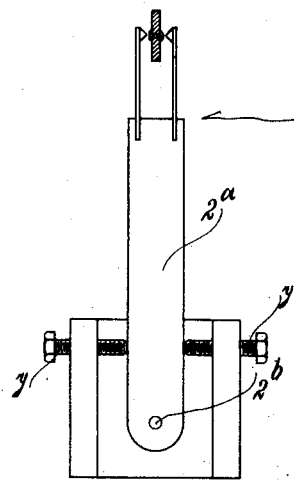
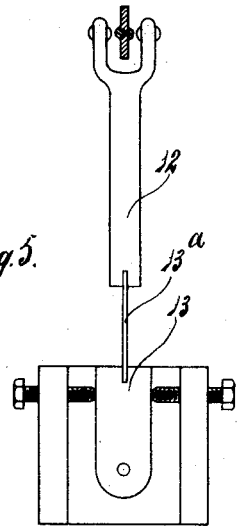
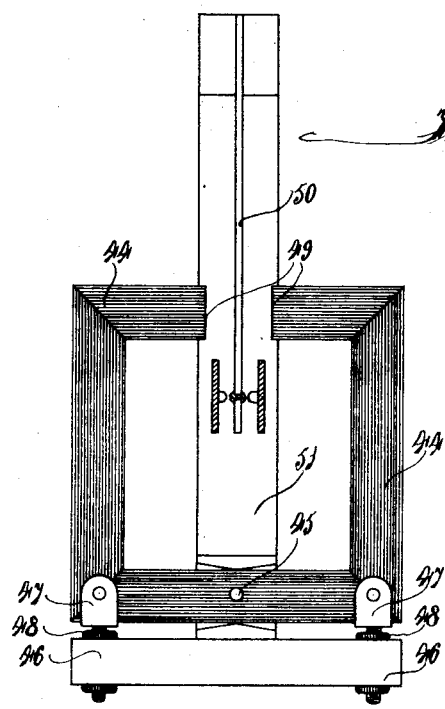
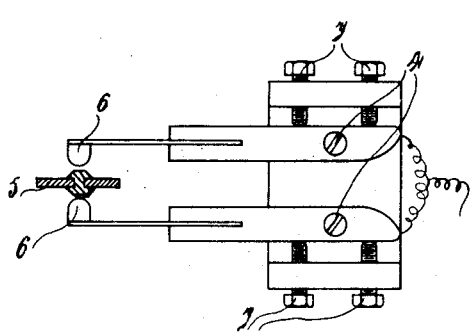
WITNESSES
Frank H Logan
Cornelius Howing
INVENTORS
HANS VON KRAMER AND
GISBERT KAPP
BY H van Dedennel
ATTORNEY

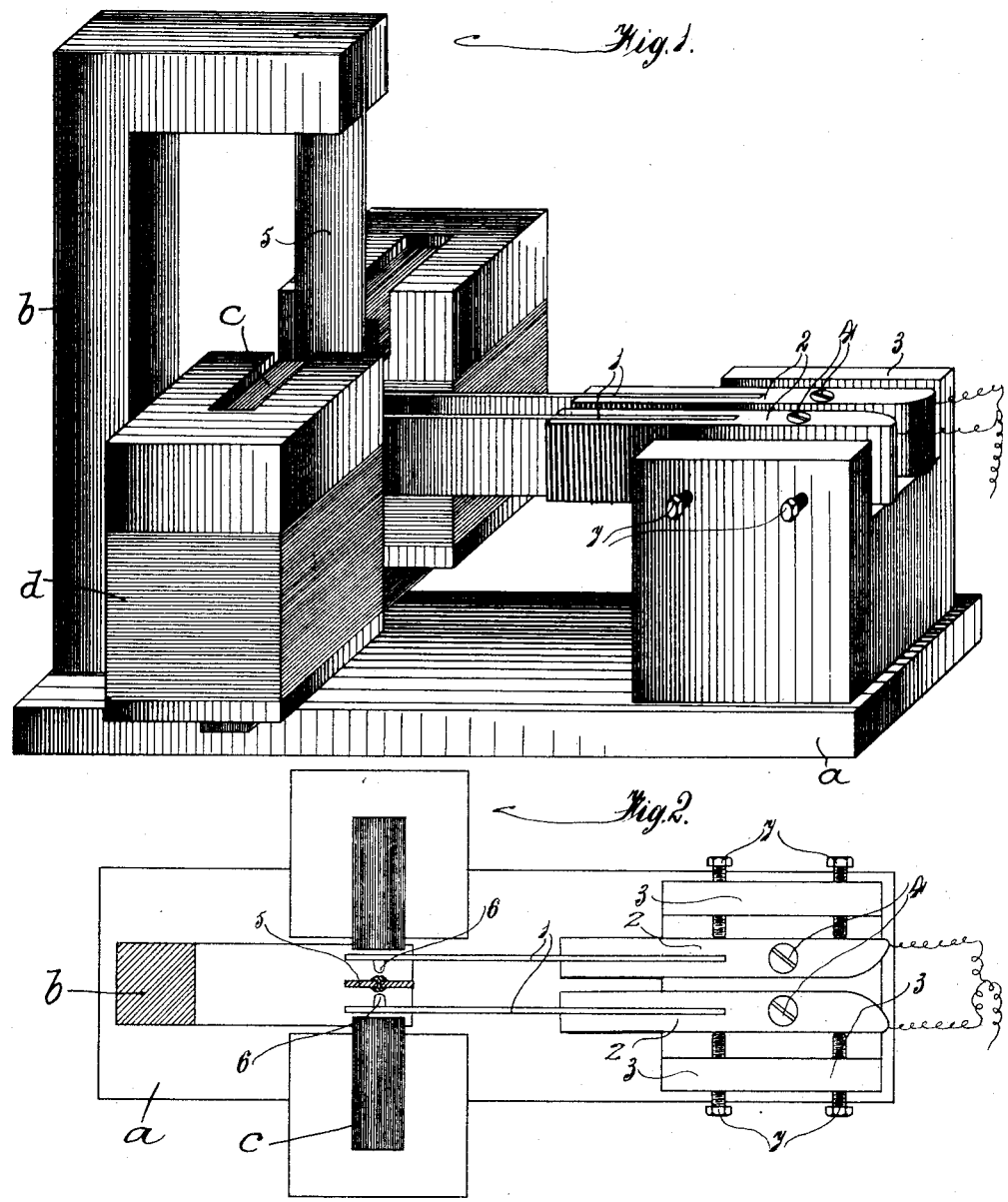

UNITED STATES PATENT OFFICE.

HANS von KRAMER AND GISBERT KAPP, OF EDGBASTON, BIRMINGHAM, ENGLAND.

RESONATING RELAY.

1,166,951.  Specification of Letters Patent.  Patented Jan. 4, 1916.

Application filed June 4, 1913. Serial No. 771,778.

*To all whom it may concern:*

Be it known that we, HANS VON KRAMER and GISBERT KAPP, subjects of the King of Great Britain, residing at "Kramersruhe," Wheatsheaf Road, Edgbaston, Birmingham, in the county of Warwick, England, and "Pen-y-boed," Pritchatts Road, Edgbaston, Birmingham, in the county of Warwick, England, respectively, have invented a new and useful Resonating Relay; and we do hereby declare the following to be a full, clear, and exact description of the same.

Our invention comprises improvements in resonating relays of the type described in our prior patent specification No. 1,067,823, dated 22nd July 1913 wherein a reed is caused to vibrate under the influence of an alternating current, the vibrating reed being employed for the purpose of making or breaking a circuit.

Our present invention primarily embodies an improved arrangement of the flanking contact members whereby they together with the reed form part of the controlling circuit. A further object of the invention is the provision of a relay in which the vibratory reed makes contact with the flanking contact springs in an improved manner.

The invention also includes improved means for adjusting the flanking springs relatively to each other and to the reed.

Referring to the drawings: Figure 1 is a perspective view of one form of relay according to our invention, Fig. 2 is a section at A—B of Fig. 1, Fig. 3 is a plan of a modified form of the invention in which the reed is adapted to make contact with the flanking springs. Fig. 4 is a plan of a modified form of the relay shown at Fig. 3. Fig. 5 is a similar view of another modification. Fig. 6 is a sectional view illustrating an improved arrangement for adjusting the air gap between each of the polar extremities and the reed.

In carrying our invention into practice the relay is provided with an insulated base $a$ upon which is disposed a permanent horse shoe magnet $b$, having a reed 5 secured in magnetic connection with one of its ends. To the lower end of the magnet $a$ core $c$ is connected, forming symmetrical extensions upon the said lower end, and this core $c$ is preferably laminated and is surrounded by coils $d$ connected in series and forming part of the controlling circuit of the relay.

Referring more particularly to Figs. 1 and 2 the flanking contact springs 1 are normally secured at their one end in carriers 2 which are mounted in the frame 3 by the screws 4 about which they may swing when the screws 7 are sufficiently retracted. The reed is shown as being mounted in a vertical plane, the contact springs being located one on each side of the reed and adapted to make contact with the reed and being preferably provided with a contact piece 6 for this purpose. The reed and the two springs 1 form part of the controlled circuit which is normally open but when the reed 5 vibrates under the influence of the current in the controlling circuit, it makes contact alternately with the two springs 1 which form alternative paths for the current in the controlled circuit. Delicate means are provided for adjusting the flanking contact springs so as to allow the reed to readily commence its vibrations, such means embody adjusting screws 7 located one on each side of the pivot 4, the one serving to move the spring contact outwardly while the other moves inwardly, and upon both being tightened against the carrier 2 the position of the same is definitely fixed.

The windings $d$ around the cores $c$ form part of the controlling circuit, and alternating current passing through the windings will cause the said reed 5 to vibrate, and also the springs 1. In the constructions shown in the prior specification referred to the springs 1 were insulated from the reed, and made contact with each other, the controlled circuit of which the springs formed part being broken when the springs separated. According to the arrangement shown in Figs. 1 and 2, the reed 5 and springs 1 all form part of the controlled circuit, this circuit being open when the reed does not touch the springs, and completed when the springs come in contact with the reed when said reed vibrates. In these forms the contact springs have a greater frequency of vibration than the reed, the reverse being the case in the forms shown in the above mentioned prior specification.

A slightly modified form of relay is illustrated in Fig. 3, which is also adapted to make contact instead of to break contact, the controlled circuit being open except when current is passing in the controlling circuit. In this case, also the flanking contact springs are made short, and have a rate of vibration much greater than the rate of vibration of the reed, so that when the reed swings one or other of the contact springs will make a continuous or substantially continuous contact with the reed. This current passing in the controlling circuit will cause the reed to make contact with one of the flanking springs, and thus establish a circuit of which both the reed and the spring form part, the two springs being arranged as alternative paths for the current.

Another form of this relay is shown by Fig. 4, in which both of the flanking springs are mounted in a carrier 2$^a$ which is pivoted at 2$^b$ adjusted by the set screw 7, the operation being similar to Fig. 3, while at Fig. 5 another form is shown in which a bifurcated stiff member 12 is used which is connected to the carrier 13 by a short stiff spring 13$^a$. In all cases the flanking member or members have a very much greater frequency of vibration than the main reed, so that when the main reed vibrates the flanking member is caused to move with it, but with a continual tendency to vibrate very much faster than the reed; thereby maintaining a continuous or substantially continuous contact between the reed and one or other of the flanking members, and thus establishing a circuit of which both the reed and flanking member form part.

At Fig. 6 an improved means for adjusting the air gap between each of the polar extremities and the reed is shown wherein the core 44 is pivotally mounted upon the magnet 51 at 45 the core being connected to the base member 46 by the links 47 and nuts 48 so that when the nuts are adjusted the core is moved to vary the air gap between the polar extremities 49 and the reed 50.

The combination of means for adjusting the air gaps between the poles and the reed and means for adjusting the air gaps between the contact members and the reed is of the greatest importance as it enables the position of the poles relatively to the reed to be so adjusted that the position of rest of the reed corresponds to the normal position from which the excursion of the reed to each side under the influence of the magnet will be the same, and the contact may then be adjusted so that the reed from its adjusted position makes a similar contact upon each side.

The relay devices may be employed for any suitable purpose, but are particularly applicable for use in connection with the railophone principle of telephony, telegraphy, or signaling, which forms the subject of prior applications Serial Nos. 690217, 746347 and Patent No. 1045412 granted to Hans von Kramer, or for the control of cinematographs as when used in conjunction with targets as in applications Serial Nos. 730970 and 731176 of Bates, Kelly and Corbin or for use in connection with wireless telegraphy for relaying the current as for ringing a bell, or performing similar operations, the relays responding to feeble alternating or varying currents of the nature of those used in telephony.

What we claim then is:—

1. In a relay contact device operated by feeble alternating currents for the purpose of establishing a local circuit, the combination of a permanent magnet; a reed tuned to the periodicity of the alternating current in the controlling circuit and having its one end firmly fixed to one pole of said magnet and forming part of the local circuit to be established; symmetrical polar extensions on the second pole of said magnet terminating on either side of the free end of said reed; coils around said polar extensions forming part of the controlling circuit; and two spring flanking members having a natural frequency greater than that of said reed, mounted on either side of said reed, normally out of contact with the said reed but alternately adapted to make contact with the said reed when it vibrates, and to form alternative paths for the passage of the current in the local circuit thereto.

2. In a relay contact-making device for the purpose of completing a local circuit, the combination of a permanent magnet; a reed forming part of the local circuit tuned to the periodicity of the alternating current in the controlling circuit and having its one end firmly fixed to one pole of said magnet; symmetrical polar extensions on the second pole of said magnet terminating on either side of the free end of said reed; coils around said polar extensions forming part of the controlling circuit; and two spring flanking members having a natural frequency very much greater than that of said reed, mounted on either side of said reed, normally out of contact with the said reed but alternately adapted to make contact with the said reed when it vibrates, and to form alternative paths for the passage of the current in the local circuit thereto.

3. In a relay contact-making device for the purpose of completing a local circuit, the combination of a vibrating reed; poles of an electromagnet terminating one upon either side of said reed; spring-mounted contact members upon either side of said reed adapted to make electrical contact therewith when the said reed vibrates; means for adjusting the air gaps between said poles and said reed; and means for adjusting the air gaps between said contact members and said reed.

4. In a relay contact-making device, the combination of a permanent magnet; laminated cores pivotally connected near one end of said magnet and forming one pole of said magnet; coils wound upon said cores in series with each other, and forming part of the controlling circuit; a reed forming part of the controlled circuit and having its free end situated between the free ends of said cores; a member fixed relatively to the magnet; and a pair of links pivotally connected to said laminated cores and adjustable relatively to said fixed member in order that the extremities of the cores may be adjusted in relation to the reed so as to vary the air gap between said cores and the reed.

5. In a relay contact-making device for the purpose of completing a local circuit, the combination of a vibrating reed; laminated cores forming the poles of an electromagnet and terminating one upon either side of said reed; a member fixed relatively to said reed; a pair of links and nuts connected to said laminated cores and to said fixed member substantially as and for the purpose set forth.

In testimony whereof, we have signed our names to this specification in the presence of two subscribing witnesses.

HANS von KRAMER.
GISBERT KAPP.

Witnesses:
HAROLD C. FORRESTER,
HERBERT J. BARTON.

Copies of this patent may be obtained for five cents each, by addressing the "Commissioner of Patents, Washington, D. C."